UNITED STATES PATENT OFFICE.

DANIEL M. LAMB, OF STRATHROY, CANADA.

IMPROVEMENT IN THE PRODUCTION OF WATER-PROOF GUMS.

Specification forming part of Letters Patent No. 140,282, dated June 24, 1873; application filed May 3, 1873.

*To all whom it may concern:*

Be it known that I, DANIEL MARTIN LAMB, of Strathroy, in the county of Middlesex and Province of Ontario, Canada, machinist, have invented a new and useful art of producing Water-Proof Gum, of which the following is a specification:

The discovery of a water-proof vulcanizable gum which would supplement, or serve as a substitute for, caoutchouc or gutta-percha, has long been a desideratum in the arts. The fact that plants of the asclepias or milk-weed family contain a large percentage of caoutchouc has been long known to botanists; but, so far as my knowledge extends, no one prior to the date of my invention succeeded in utilizing this percentage of caoutchouc as an article of commerce.

My invention is based upon the discovery that the caoutchouc contained in the plants of this family can be extracted and rendered available as an article of commerce; and my improvement consists in a novel art or process of extracting caoutchouc from plants of the milk-weed family, or other analogous plants possessing the same property, by subjecting the plants, while in a green state, to a process of fermentation, which separates the gum from the woody fiber. I have discovered, moreover, that, although it is not absolutely necessary to the success of the process, the fermentation may be carried to such a state as to evolve heat enough to destroy the fiber of the plant without deteriorating the quality of the gum produced, as the caoutchouc of the plant is capable of resisting high temperatures without injury.

In order to carry out my invention in the best way now known to me, I take the ordinary milk-weed, by preference cut in a green state, when it is full of juice and its fiber is tender, and pack it in a suitable vessel in masses sufficient to produce fermentation. I prefer, for this purpose, tanks or boxes with walls sufficiently open to afford slight ventilation, and with a covering tight enough to exclude rain. This fermentation may, as before remarked, be carried to a point sufficient to destroy the fiber of the plant, if desired, without injury to the gum. The degree and duration of fermentation, being dependent somewhat upon temperature, moisture, and the condition of the plants, must be governed somewhat by the judgment of the workman. I have, however, usually found seventy-two hours a period sufficiently long to thoroughly separate the gum from the fiber. The gummy liquid may then be extracted by pressure, strained, and inspissated by evaporation until sufficiently hardened to be handled.

The gum may either be used in its raw state or it may be cleansed and treated in any of the modes now practiced in vulcanizing the ordinary caoutchouc of commerce, which it closely resembles in its characteristic properties.

I deem it unnecessary to describe the machinery employed in carrying out my process, as it constitutes no part of the subject-matter herein claimed, and its construction and mode of operation are familiar to those skilled in the art to which my invention pertains.

My process of extracting vulcanizable water-proof gum from plants by fermentation, and subsequently inspissating the resultant juice, is not limited in its application to milk-weed, but may be applied to any plants possessing similar properties.

I claim—

The art of extracting a water-proof gum from plants of the asclepias or milk-weed family, or other plants possessing similar properties, by subjecting the plants to fermentation, and inspissating the resulting liquid by evaporation.

DANIEL M. LAMB.

Witnesses:
M. KNOWLTON,
OCTAVIUS KNIGHT.